United States Patent
Chen

(10) Patent No.: US 12,320,498 B1
(45) Date of Patent: Jun. 3, 2025

(54) LONG-DISTANCE ASCENT-DESCENT CLOCKWORK

(71) Applicant: Ming-Ken Chen, Taipei (TW)

(72) Inventor: Ming-Ken Chen, Taipei (TW)

(*) Notice: Subject to any disclaimer, the term of this patent is extended or adjusted under 35 U.S.C. 154(b) by 0 days.

(21) Appl. No.: 18/890,762

(22) Filed: Sep. 20, 2024

(51) Int. Cl.
*F21V 14/02* (2006.01)
*A63J 19/00* (2006.01)
*F16H 19/04* (2006.01)
*F21W 121/00* (2006.01)
*H04R 1/02* (2006.01)

(52) U.S. Cl.
CPC ............ *F21V 14/02* (2013.01); *A63J 19/006* (2013.01); *F16H 19/04* (2013.01); *H04R 1/028* (2013.01); *F21W 2121/00* (2013.01)

(58) Field of Classification Search
CPC ........ A63J 19/006; F16H 19/04; H04R 1/028; F21V 14/02
See application file for complete search history.

(56) References Cited

U.S. PATENT DOCUMENTS

| 2016/0033118 A1* | 2/2016 | Remus | F16M 11/18 248/404 |
| 2018/0094794 A1* | 4/2018 | Datta | F21V 14/02 |
| 2021/0122618 A1* | 4/2021 | Bago | B64F 5/40 |

* cited by examiner

*Primary Examiner* — Karabi Guharay
(74) *Attorney, Agent, or Firm* — Leong C. Lei

(57) ABSTRACT

A long-distance ascent-descent clockwork includes a first driving module, a rack, and a second driving module. The first driving module has a light-emitting unit and a first motor. The rack is coupled to a supporting rod. The supporting rod has one end joined to the first driving module. The second driving module has a second motor. The second motor has a first rotating shaft having a gear for meshing with the rack to drive the rack to ascend and descend. The first driving module has a swinging mechanism for driving a swinging rod to swing automatically. The second driving module is joined to legs and a base and thereby can move and rotate automatically. A theme shaped object being a white ghost shape and worn externally on the long-distance ascent-descent clockwork ascends and descends, with its head swinging leftward and rightward, and its hands swinging inward and outward.

9 Claims, 6 Drawing Sheets

LONG-DISTANCE ASCENT-DESCENT CLOCKWORK

TECHNICAL FIELD

The present disclosure relates to a clockwork, and more particularly to a long-distance ascent-descent clockwork that ascends and descends steadily for a long distance without deviation, is capable of increasing an ascent/descent ratio several times or more and emitting light and sound, has safe gears which are strong enough to be protected against compression-induced damage, and is unlikely to rotate under an inappropriate external force.

BACKGROUND OF THE INVENTION

For most products, a clockwork is a core power device capable of performing specific dynamic motions or capable of moving and particularly capable of driving specific dynamic motions.

Some products, such as devices, robots, and toys, have to be equipped with an ascent-descent clockwork in order to perform ascent-descent dynamic motions. Therefore, it is imperative to provide a long-distance ascent-descent clockwork that ascends and descends steadily for a long distance without deviation, is capable of increasing an ascent/descent ratio several times or more and emitting light and sound, has safe gears which are strong enough to be protected against compression-induced damage, and is unlikely to rotate under an inappropriate external force.

SUMMARY

To meet the aforesaid demand, it is an objective of the disclosure to provide a long-distance ascent-descent clockwork that ascends and descends steadily for a long distance without deviation, is capable of increasing an ascent/descent ratio several times or more and emitting light and sound, has safe gears which are strong enough to be protected against compression-induced damage, and is unlikely to rotate under an inappropriate external force.

To achieve the above and other objectives, the disclosure provides a long-distance ascent-descent clockwork comprising a first driving module, a rack and a second driving module. The first driving module has a light-emitting unit and a first motor. The light-emitting unit emits light. The first motor drives the light-emitting unit rotating by an angle. The rack has one side coupled to a supporting rod. The supporting rod has one end joined to the first driving module. The second driving module has a second motor and a sound-emitting unit. The second motor has a first rotating shaft. The sound-emitting unit emits sound. The rack is movably penetratingly disposed at the second driving module. The first rotating shaft has at least one gear being a safe gear for meshing with the rack to drive the rack ascending and descending.

Therefore, the first driving module ascends and descends steadily for a long distance without deviation, is capable of increasing an ascent/descent ratio several times or more and emitting light, has safe gears which are strong enough to be protected against compression-induced damage, and is unlikely to rotate under an inappropriate external force; whereas the second driving module emits sound.

The first driving module has a swinging mechanism for driving a swinging rod to swing automatically.

The second driving module is joined to legs and a base and thereby is capable of moving and rotating automatically.

A theme shaped object, such as a white ghost shape, can be worn externally. The theme shaped object can ascend and descend, with its head swinging leftward and rightward, and its hands swinging inward and outward. The theme shaped object emits light and sound through the first driving module and the second driving module and thus is lifelike and interesting.

DETAILED DESCRIPTION

Figure 1:
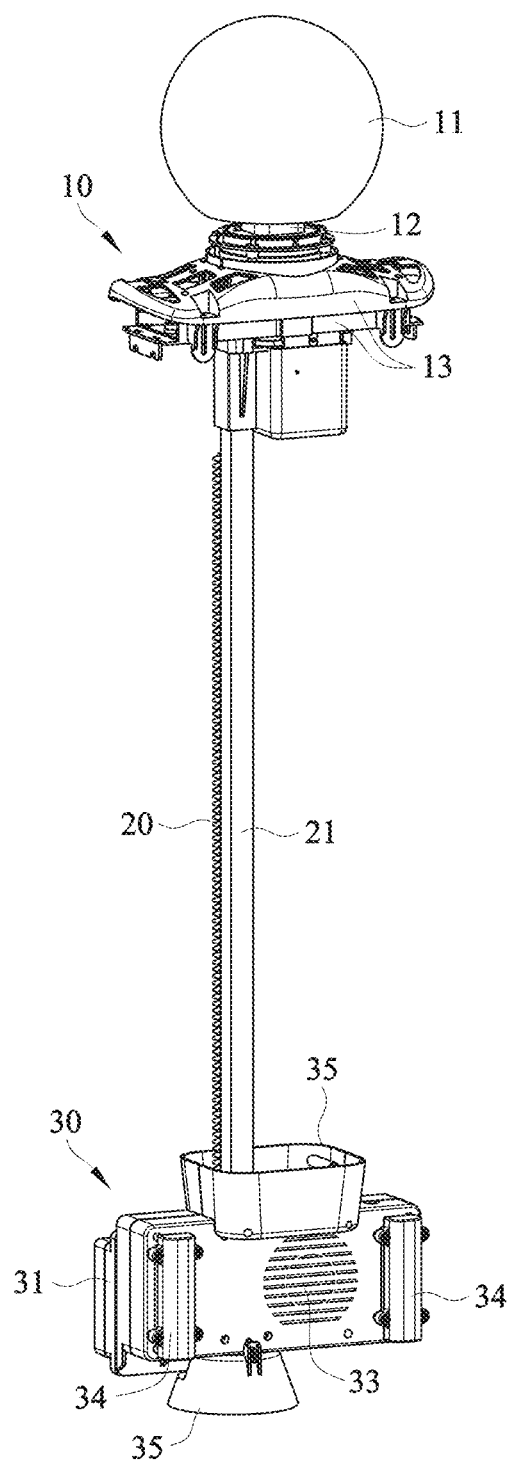
FIG. 1 is a perspective view of a long-distance ascent-descent clockwork of the disclosure.
Figure 2:
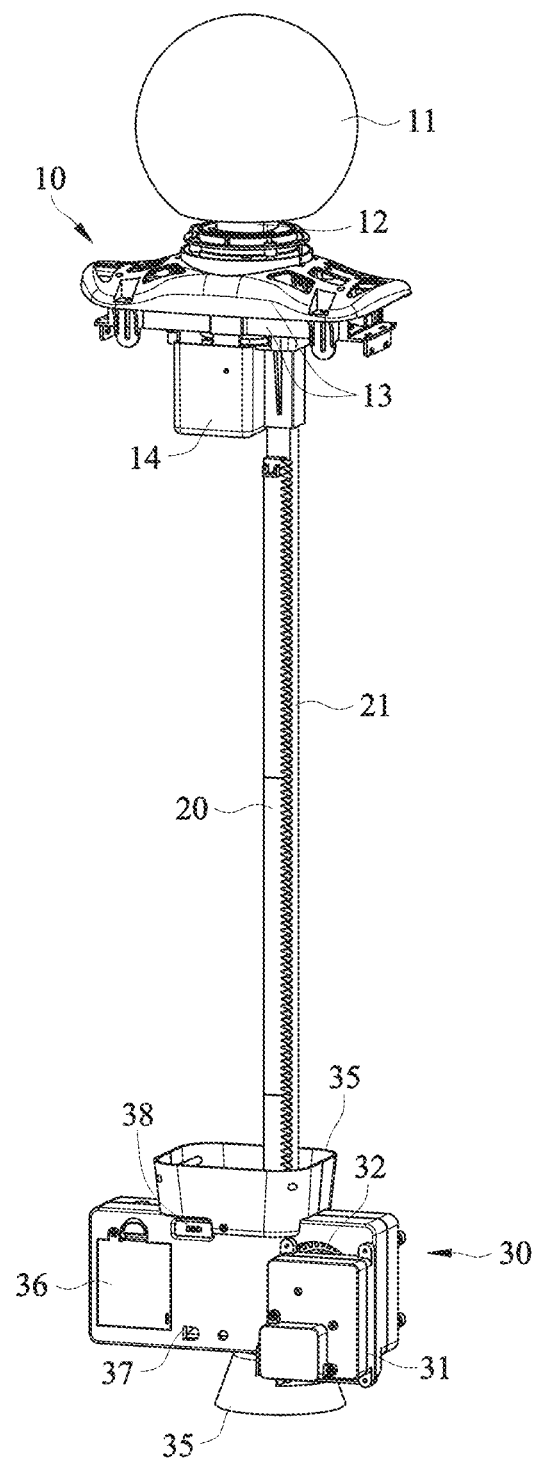
FIG. 2 is a perspective view of the long-distance ascent-descent clockwork of the disclosure from another view angle.
Figure 3:
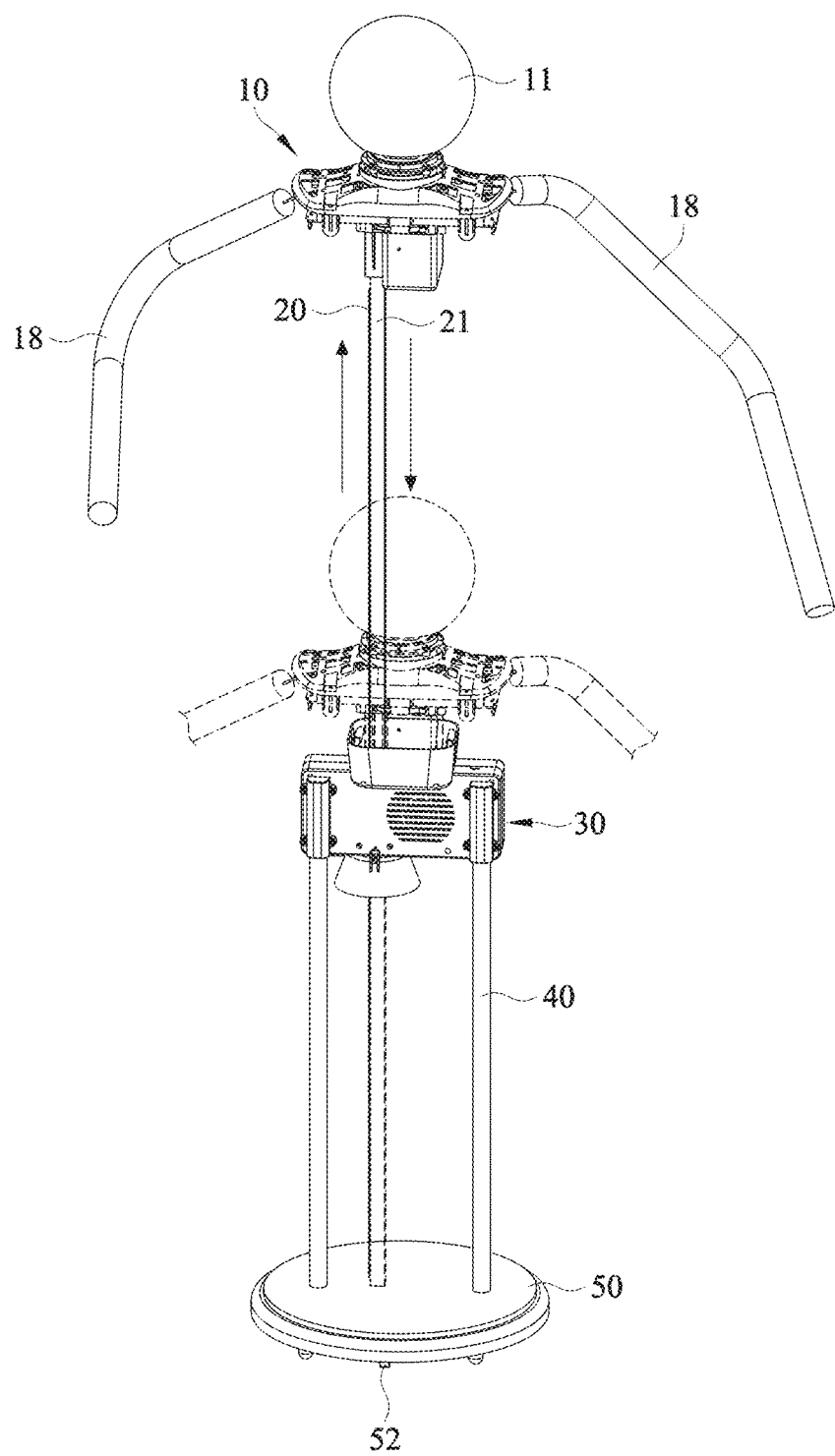
FIG. 3 is a schematic view of how the long-distance ascent-descent clockwork of the disclosure ascends and descends.
Figure 4:
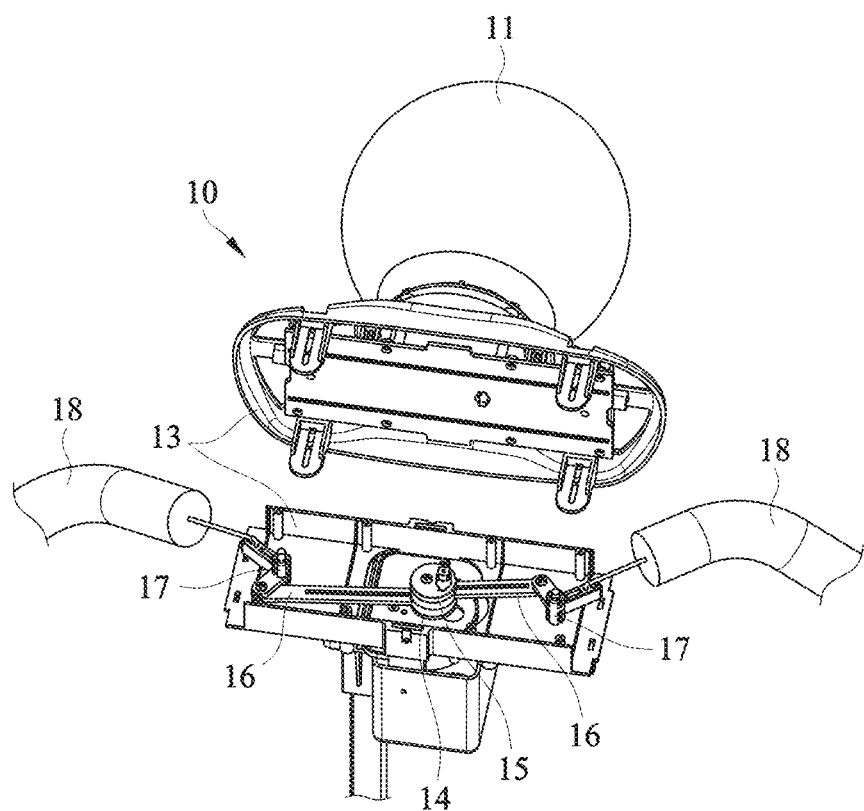
FIG. 4 is a schematic view of a swinging mechanism of the long-distance ascent-descent clockwork of the disclosure.
Figure 5:
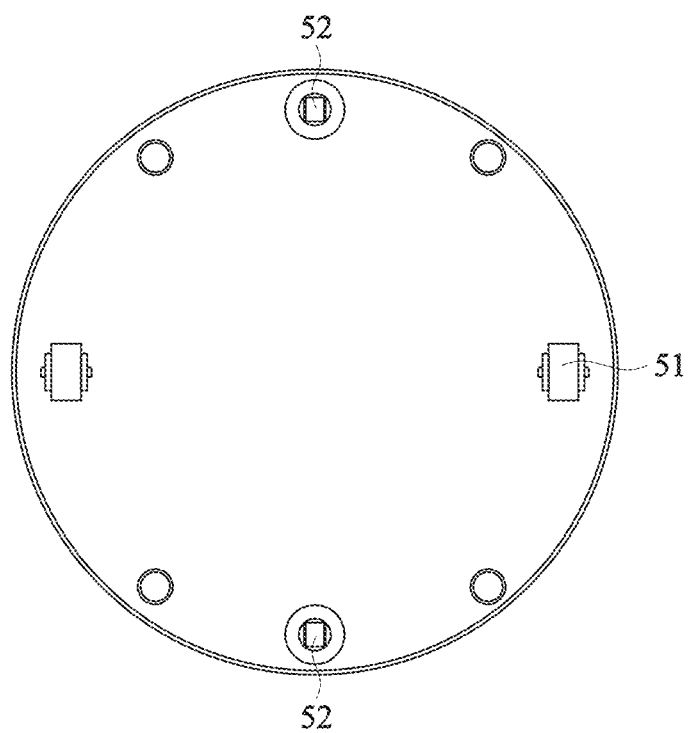
FIG. 5 is a bottom view of a base of the long-distance ascent-descent clockwork of the disclosure.
Figure 6:
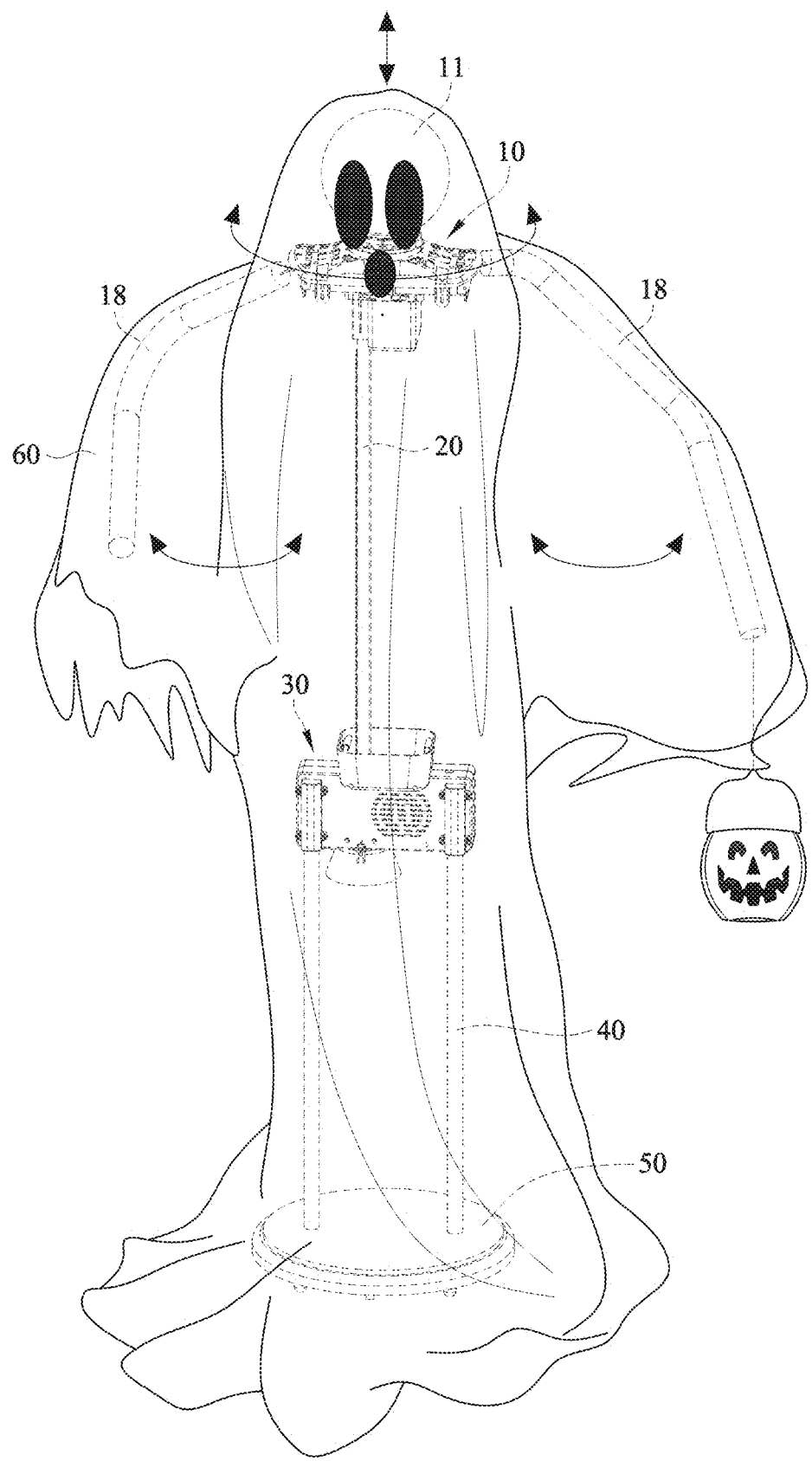
FIG. 6 is a schematic view of how a theme shaped object worn externally on the long-distance ascent-descent clockwork of the disclosure ascends and descends.

Refer to FIG. 1 through FIG. 6, FIG. 1 is a perspective view of a long-distance ascent-descent clockwork of the disclosure. FIG. 2 is a perspective view of the long-distance ascent-descent clockwork of the disclosure from another view angle. FIG. 3 is a schematic view of how the long-distance ascent-descent clockwork of the disclosure ascends and descends. FIG. 4 is a schematic view of a swinging mechanism of the long-distance ascent-descent clockwork of the disclosure. FIG. 5 is a bottom view of a base of the long-distance ascent-descent clockwork of the disclosure. FIG. 6 is a schematic view of how a theme shape object worn externally on the long-distance ascent-descent clockwork of the disclosure ascends and descends.

Referring to FIG. 1 through FIG. 6, the disclosure provides a long-distance ascent-descent clockwork comprising a first driving module 10, a rack 20 and a second driving module 30.

The first driving module 10 has a light-emitting unit 11 and a first motor 12. The light-emitting unit 11 emits light. The first motor 12 drives the light-emitting unit 11 rotating by an angle.

The rack 20 has one side coupled to a supporting rod 21. The supporting rod 21 has one end joined to the first driving module 10.

The second driving module 30 has a second motor 31 and a sound-emitting unit 33. The second motor 31 has a first rotating shaft. The sound-emitting unit 33 emits sound. The rack 20 is movably penetratingly disposed at the second driving module 30. The first rotating shaft has at least one gear 32 being a safe gear for meshing with the rack 20 to drive the rack 20 ascending and descending.

In an embodiment, the light-emitting unit 11 comprises therein a removable luminous element.

Therefore, the light-emitting unit 11 and the luminous element can be mounted in place and changed easily.

In an embodiment, the first driving module 10 has a swinging driving mechanism. The swinging driving mechanism comprises a casing 13 comprising an upper case and a lower case and having therein a third motor 14. The third motor 14 has a second rotating shaft 15. The second rotating shaft 15 is flanked by and linked to two linkages 16. The linkages 16 are each pivotally connected to a fulcrum rod 17. The fulcrum rods 17 are disposed in the casing 13. The outer end of each of the fulcrum rods 17 is joined to a swinging rod 18.

Therefore, the third motor 14 is capable of driving the swinging rod 18 to swing automatically.

In an embodiment, the supporting rod 21 is made of metal and has a hollow core for receiving a power line and a transmission line.

Therefore, the supporting rod 21 reinforces the rack 20 to preclude inappropriate deviations in the course of the long-distance ascents and descents of the rack 20 to not only enhance the stability of equilibrium of the supporting rod 21 but also protect the power line and the transmission line.

In an embodiment, the second driving module 30 has a plurality of fitting hole receptacles 34 fitted to a plurality of legs 40. The legs 40 are joined to a base 50. The base 50 has a plurality of driving rollers 51 and a plurality of steering wheels 52. The driving rollers 51 allow the base 50 to generate portable power. The steering wheels 52 allow the base 50 to rotate.

The second driving module 30 is capable of moving and rotating automatically.

In an embodiment, two flanges 35 are disposed on and under the second driving module 30 respectively and define an enclosing protective space.

The flanges 35 have an enclosing protective effect on the second driving module 30 at the movably penetrating points of the rack 20 to prevent the clogging and intrusions of foreign bodies and avoid the occurrence of malfunctions.

In an embodiment, the second driving module 30 has a battery unit 36, a power port 37, and a switch 38. The battery unit 36 provides portable power. The power port 37 is connected to an external power source. The switch 38 is adapted to start the power source.

In an embodiment, a theme shaped object 60 is worn externally on the first driving module 10, the rack 20, and the second driving module 30.

In an embodiment, the theme shaped object 60 is a white ghost shape.

The structural features and relationships of the disclosure are described above. The characteristics and advantages of the disclosure are described below.

The first driving module 10 ascends and descends steadily for a long distance without deviation, is capable of increasing an ascent/descent ratio several times or more and emitting light and sound, has the gears 32 being safe gears strong enough to be protected against compression-induced damage, and is unlikely to rotate under an inappropriate external force.

The first driving module 10 has a swinging mechanism for driving the swinging rod 18 to swing automatically.

The second driving module 30 is joined to the legs 40 and the base 50 and thereby is capable of moving and rotating automatically.

The theme shaped object 60 worn externally is a white ghost shape. The theme shaped object 60 can ascend and descend, with its head swinging leftward and rightward, and its hands swinging inward and outward. The theme shaped object 60 emits light and sound through the first driving module 10 and the second driving module 3 and thus is lifelike and interesting.

What is claimed is:

1. A long-distance ascent-descent clockwork, comprising:
    a first driving module having a light-emitting unit and a first motor, the light-emitting unit emits light, and the first motor drives the light-emitting unit to rotate by an angle;
    a rack having a side coupled to a supporting rod, the supporting rod having an end joined to the first driving module; and
    a second driving module having a second motor and a sound-emitting unit, the second motor having a first rotating shaft, and the sound-emitting unit emits sound, wherein the rack is movably penetratingly disposed at the second driving module, and the first rotating shaft has at least one gear being a safe gear for meshing with the rack to drive the rack to ascend and descend.

2. The long-distance ascent-descent clockwork of claim 1, wherein the light-emitting unit comprises therein a removable luminous element.

3. The long-distance ascent-descent clockwork of claim 1, wherein the first driving module has a swinging driving mechanism comprising a casing, with the casing comprising an upper case and a lower case and having therein a third motor, the third motor having a second rotating shaft, the second rotating shaft being flanked by and linked to two linkages, the linkages each being pivotally connected to a fulcrum rod disposed in the casing, the fulcrum rods each having an outer end joined to a swinging rod.

4. The long-distance ascent-descent clockwork of claim 1, wherein supporting rod is made of metal and has a hollow core for receiving a power line and a transmission line.

5. The long-distance ascent-descent clockwork of claim 1, wherein the second driving module has a plurality of fitting hole receptacles fitted to a plurality of legs, the legs being joined to a base, the base having a plurality of driving rollers and a plurality of steering wheels, the driving rollers allow the base to generate portable power, and the steering wheels allow the base to rotate.

6. The long-distance ascent-descent clockwork of claim 1, wherein two flanges are disposed on and under the second driving module respectively and define an enclosing protective space.

7. The long-distance ascent-descent clockwork of claim 1, wherein the second driving module has a battery unit, a power port, and a switch, the battery unit providing portable power, the power port being connected to an external power source, and the switch being adapted to start the power source.

8. The long-distance ascent-descent clockwork of claim 1, wherein a theme shaped object is worn externally on the first driving module, the rack, and the second driving module.

9. The long-distance ascent-descent clockwork of claim 8, wherein the theme shaped object is a white ghost shape.

* * * * *